United States Patent
Yen

(10) Patent No.: US 6,841,319 B2
(45) Date of Patent: Jan. 11, 2005

(54) METHOD FOR MANUFACTURING OPTICAL DEVICES

(75) Inventor: Jui Hung Yen, Shulin (TW)

(73) Assignee: Prodisc Technology Inc., Taipei (TW)

( * ) Notice: Subject to any disclaimer, the term of this patent is extended or adjusted under 35 U.S.C. 154(b) by 226 days.

(21) Appl. No.: 10/237,042

(22) Filed: Sep. 9, 2002

(65) Prior Publication Data

US 2004/0047983 A1 Mar. 11, 2004

(51) Int. Cl.⁷ .............................. B05D 5/06; G02B 5/20
(52) U.S. Cl. .......................... 430/7; 430/321; 427/165; 427/259; 427/272; 427/282
(58) Field of Search .................................. 427/162, 164, 427/165, 259, 269, 272, 282, 289; 430/7, 321

(56) References Cited

U.S. PATENT DOCUMENTS 5,439,582 A  *  8/1995  Oka et al. .................... 205/135

FOREIGN PATENT DOCUMENTS

JP           2-157804 A  *  6/1990

* cited by examiner

Primary Examiner—John A. McPherson
(74) Attorney, Agent, or Firm—Birch, Stewart, Kolasch & Birch, LLP

(57) ABSTRACT

A method for manufacturing an optical device, including forming a thermal tape on a glass substrate, cutting the thermal tape into a plurality of tape areas, removing at least one of the tape areas, and coating a first color film on the tape area without the thermal tape. In this case, the thermal tape is cut into a plurality of tape areas, so as to define the pattern of the optical device.

9 Claims, 3 Drawing Sheets

METHOD FOR MANUFACTURING OPTICAL DEVICES

BACKGROUND OF THE INVENTION

1. Field of the Invention

The invention relates to a method for manufacturing an optical device, and more specifically to a method for manufacturing an optical filter.

2. Description of the Related Art

The color filter is a key element in the colorization of liquid crystal displays (LCD) because LCD displays with high gray scale output display full-color using a color filter. More specifically, the color filter generates the three primary colors of red (R), green (G) and blue (B) by way of filtering. The three primary colors are mixed by the color filter according to various proportions of each of the primary colors so as to represent various colors. Accordingly, the LCD may then display full color.

In general, the color filter includes multiple R, G, and B pixel formations on a glass substrate. Therefore, after passing through these pixels, the white backlight becomes R, G, and B light rays, which constitute the three primary colors. Methods often used for manufacturing conventional color filters include a printing method, dyeing method, pigment dispersion method, dry-film method, an electrode position method, and the like, wherein the pigment dispersion method is the primary method available in the market. A conventional method for manufacturing a color filter will be described using the pigment dispersion method as an example.

Referring to FIG. 1, the conventional method for manufacturing a color filter includes the following steps.

First, in the conventional method for color filter manufacturing, a glass substrate 11 is provided, and the glass substrate is cleaned with a cleaner (not shown). For example, the glass substrate 11 often used to manufacture a thin film transistor (TFT) is the non-alkali type glass, while the method often used for cleaning is the ultra-violet (UV) cleaning method. The UV cleaning method utilizes UV rays to convert oxygen molecules in the air into ozone molecules, which dissolve the remaining organic substances on the glass substrate 11. The UV cleaning method can clean organic substances with a maximum thickness of about 100 angstroms. The UV cleaning method mentioned above may also be referred to as the dry cleaning method. Other methods, in which a cleaning agent or deionized water is added, may be referred to as wet cleaning methods.

The clean glass substrate 11 is coated with a photo-resist (PR) 12 of the required color, such as a red photo-resist. The materials constituting the photo-resist 12 may include resin, photo-active compounds (PAC), and solvents. Photo-resists suitable for the photo-resist 12 may be divided into a positive photo-resist and a negative photo-resist according to its property against light rays. The positive photo-resist may be dissolved in a developer and is typically used in the manufacturing processes of high-resolution products (e.g. TFT-Arrays). Alternately, the negative photo-resist does not dissolve in a developer and is typically used in manufacturing processes greater than 3 μm, such as the manufacturing processes for color filters. In addition, the photo-resist 12 is coated on the glass substrate 11 in the coating process. In the coating process, a tube may be used to lower the photo-resist 12 from the center of the glass substrate 11, or a slit may be used to coat a layer of photo-resist 12 on the glass substrate 11. After the photo-resist 12 is coated, the glass substrate 11 is spun and causes the photo-resist 12 to uniformly coat the glass substrate 11.

Next, a photolithography process is performed to form a pattern, as designed on the mask 60, on the photo-resist 12. In detail, the glass substrate 11 coated with the photo-resist 12 is transferred to an exposure machine (not shown). Then, the procedures of pre-alignment, proximity gap measurement, mask pattern alignment, exposure, and the like are performed in the exposure machine. By performing the procedures, a desired pattern may be formed on the photo-resist 12.

The mentioned color filter is further coated with a plurality of photo-resists having various colors, such as a green photo-resist 13 and a blue photo-resist 14. It should be noted that the steps for forming the photo-resists 13 and 14 are performed by repeating the above-mentioned coating, photolithography, and development processes.

Finally, a post-baking process is performed to fully cure the photo-resists 12 to 14 so as to prevent the photo-resists 12 to 14 from being easily stripped in the following processes.

In addition, for some specific products, an over coat layer 15 must be formed on photo-resists 12 to 14 so that the surface of the color filter can be made smoother and the photo-resists 12 to 14 can be protected.

However, since the conventional method for manufacturing the color filter utilizes the mask 60 in the photolithography process, the mask 60 must be formed according to a desired pattern. Furthermore, an exposure machine must be used to perform the procedures of alignment, exposure, and the like. The mask and the exposure machine may present additional costs to the manufacturer.

Consequently, it is an important subject of the invention to provide a method for manufacturing an optical device without using a mask to perform a photolithography process.

SUMMARY OF THE INVENTION

In view of the above-mentioned problems, an objective of the invention is to provide a method for manufacturing an optical device without using a mask to perform a photolithography process.

To achieve the above-mentioned objective, the method for manufacturing an optical device of the invention may include the steps of: forming a thermal tape on a glass substrate; cutting the thermal tape into a plurality of tape areas; removing at least one of the tape areas; and coating a first color film on the tape area without the thermal tape. In this invention, the thermal tape is cut into a plurality of tape areas, so as to define the pattern of the optical device.

In addition, the method of the invention may further include the steps of: coating a first over coat film on the first color film; removing at least another one of the tape areas; and coating a second color film on the tape area without the thermal tape.

In summary, the method for manufacturing the optical device described by the invention is performed by cutting the thermal tape into a plurality of tape areas according to the desired pattern, so that tape areas for the color films to-be-coated can be defined. Therefore, it is not necessary to use a mask to perform the photolithography process that defines the desired pattern, thereby eliminating the cost of the mask and the exposure machine.

DETAILED DESCRIPTION OF THE INVENTION

The method for manufacturing an optical device in accordance with a preferred embodiment of the invention will be described with reference to the accompanying drawings, wherein the same reference numbers denote the same elements.

Figure 1:
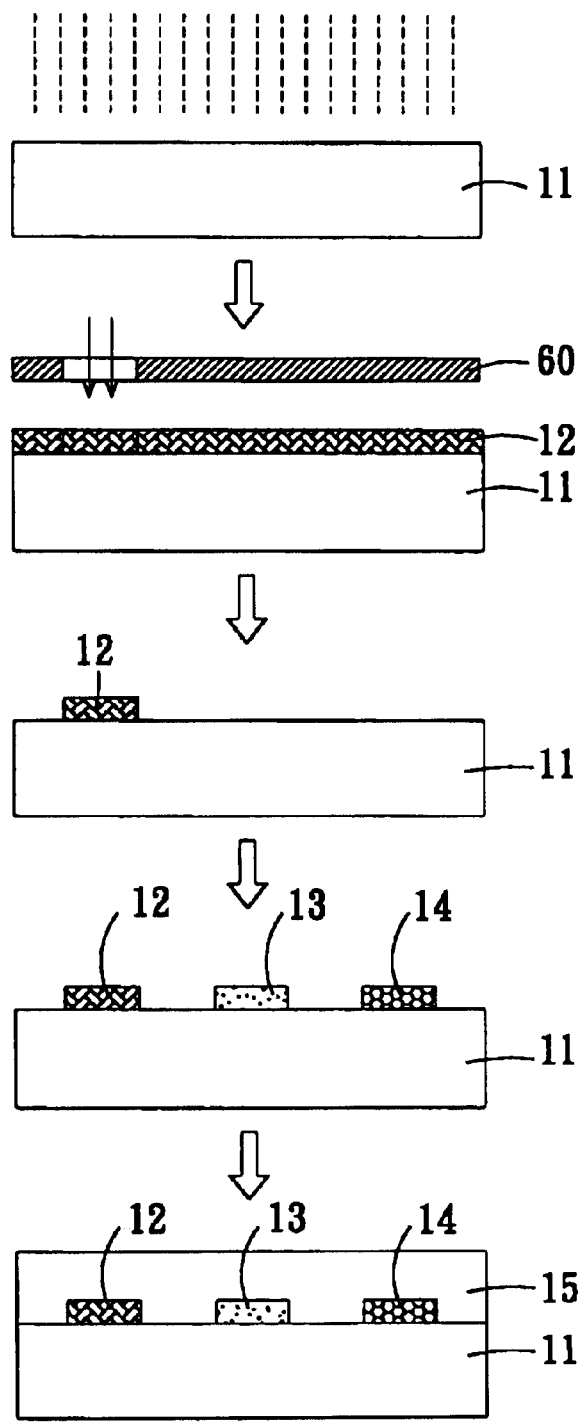
FIG. 1 is a schematic illustration showing a conventional method for manufacturing a full-color filter.
Figure 2:
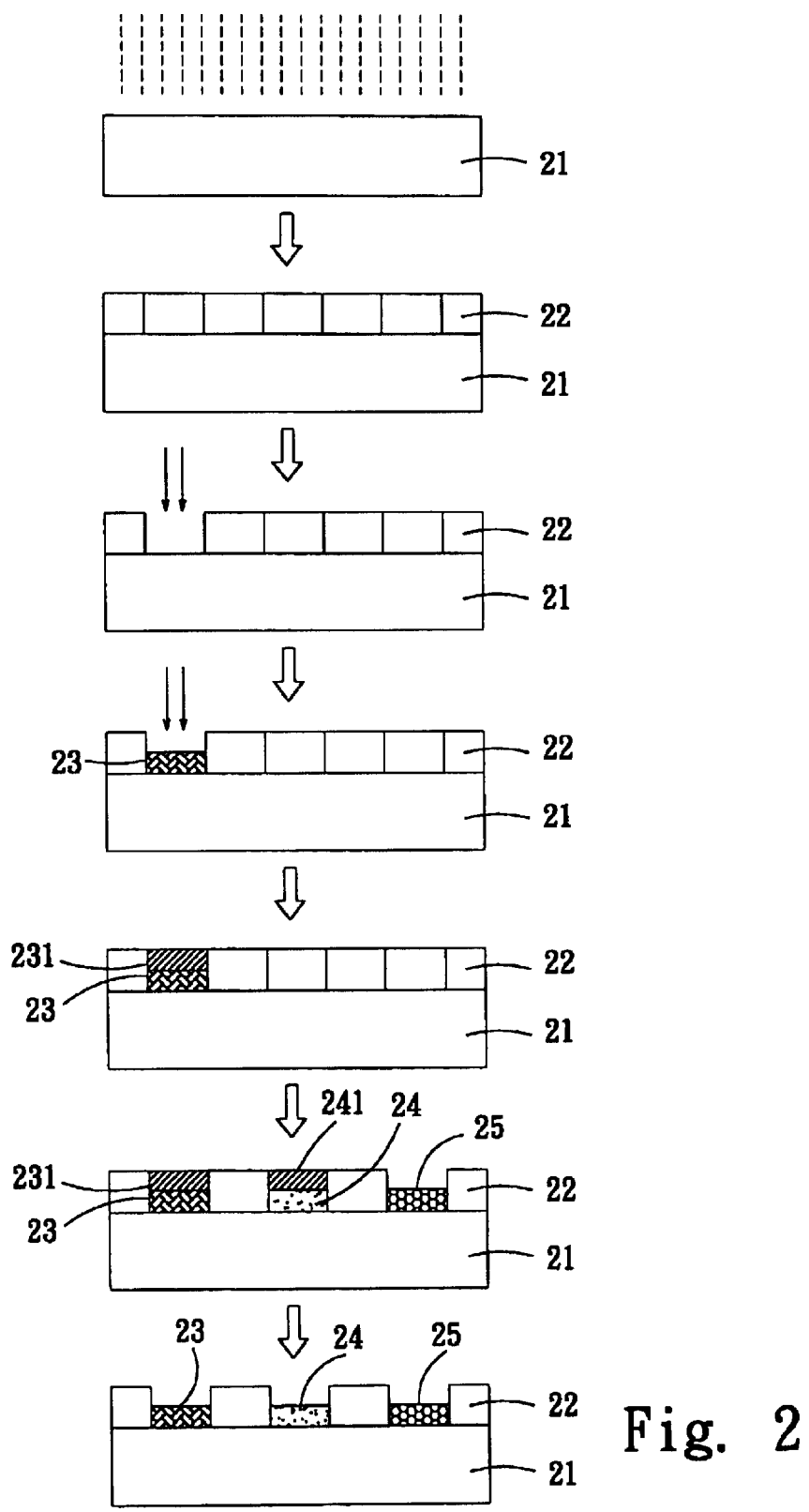
FIG. 2 is a schematic illustration showing a method for manufacturing a full-color filter in accordance with a preferred embodiment of the invention.

Referring to FIG. 2, the method for manufacturing an optical device in accordance with a preferred embodiment of the invention includes the following steps.

First, a glass substrate 21 is provided for manufacturing the optical device in accordance with the embodiment of the invention. Then, a cleaner (not shown) is utilized to clean the surfaces of the glass substrate 21. In addition, the cleaned glass substrate 21 may be post-baked in this step, so as to remove the moisture remaining on the glass substrate 21 and thus increase its adhesive force. The details of this step have been described above in the prior art, so the description thereof is omitted.

Next, a thermal tape 22 is adhered to the cleaned glass substrate 21. In this embodiment, the thermal tape 22 used is composed of a material, which possesses a small heat expansion coefficient and is free from property change when heated. That is, the material will withstand at least the highest temperature in the manufacturing processes. In addition, during the process for adhering the thermal tape 22, a roller or rollers may be used to remove gas from between the glass substrate 21 and the thermal tape 22, so as to prevent an improper optical device from being manufactured due to residual gas.

Figure 3A:
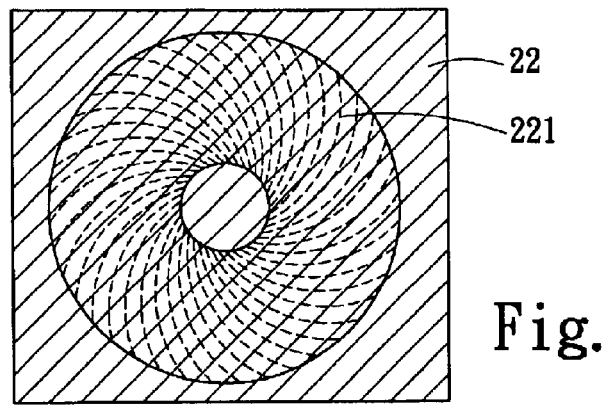
FIG. 3A is a schematic illustration showing the desired pattern cut on the thermal tape in the method of the invention.

Then, the thermal tape 22 is cut into a plurality of tape areas so as to define the pattern of the optical device. In this embodiment, the thermal tape 22 is cut using an irregular concave cutter. One of ordinary skill in the art will understand that the desired patterns on the thermal tape 22 are easily cut with the irregular concave cutter. As shown in FIG. 3A, the thermal tape 22 is rectangular, two concentric circles are cut on the center of the tape 22, and the tape area between the concentric circles is cut into a plurality of long-arced tape areas.

Then, as shown in FIG. 2 again, at least one tape area of the thermal tape 22 is removed. In the embodiment, as shown in FIG. 3A, several long-arced tape areas 221, located in equal spaces on the pattern of the thermal tape 22 are stripped.

Figure 3B:
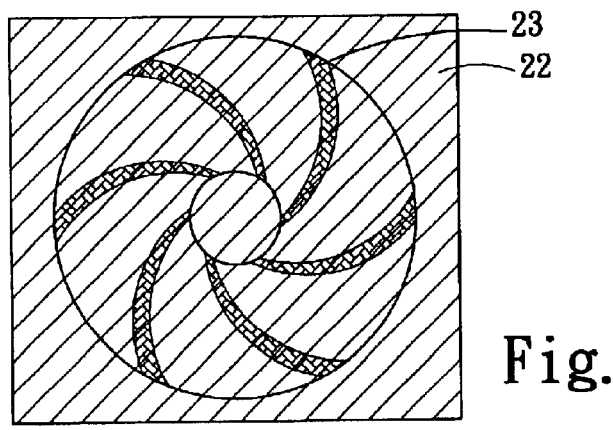
FIG. 3B is a schematic illustration showing the formation of the first color film in the method of the invention.

Finally, as shown in FIG. 2, a first color film 23 is coated on the tape areas without the thermal tape 22. In the embodiment, the first color film 23 is red and is coated on the long-arced tape area 221(as shown in FIG. 3B).

As described above, the method for forming an optical device in accordance with the preferred embodiment of the invention may be used to manufacture a full-color filter by forming the first color film 23 on the optical device and then forming color films with other colors on the first color film 23. In order to prevent the first color film from being contaminated during the formation of other color films with other colors, an over coat film is formed in advance on the first color film 23.

As shown in FIG. 2, a first over coat film 231 is formed on the first color film 23. In the embodiment, the first over coat film 231 is a photo-resist layer made of a material such as resin, photoactive compound, solvent, or the like.

In the embodiment, a soft baking procedure is then performed to transit the first over coat film 231 from the liquid state to the solid state, so as to enhance the adhesive force between the first over coat film 231 and the first color film 23. The conditions (e.g., heating temperature, heating time and the like) used in the soft baking procedure may be determined according to the used material of the first over coat film 231. For example, the first over coat film 231 may be solidified by heating to 100° C. for 30 minutes.

After the soft baking procedure for the first over coat film 231 is finished, an exposure and development procedure for the first over coat film 231 must be performed. By doing this, the coated first color film 23 can be protected from damage in the following manufacturing processes.

As shown in FIG. 2, a procedure for coating a second color film 24 is then performed. The procedure is performed by repeating the above-mentioned procedure for removing another tape area of the thermal tape 22 and the procedure for coating the second color film 24 on another tape area without the thermal tape 22. In addition, a second over coat film 241 must be coated on the second color film 24 in order to prevent the second color film 24 from being damaged in the following manufacturing processes. Since the detailed steps have been described above, the description thereof will be omitted.

According to the above-mentioned procedures, a third color film 25 may then be coated. Since three individual color films are coated with the three colors in this embodiment, it is not necessary to form an over coat film on the third color film 25. In the embodiment, the second color film 24 is green and the third color film 25 is blue.

As shown in FIG. 2 again, after three individual color films are coated, an etching process is performed to strip the first over coat film 231 and the second over coat film 241.

Figure 3C:
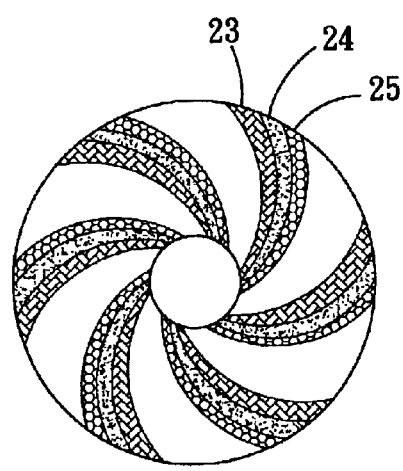
FIG. 3C is a schematic illustration showing the full-color filter obtained according to the method of the invention.

Finally, the redundant part on the glass substrate 21 is stripped as desired, so as to manufacture a desired optical device. As shown in FIG. 3A, a circular pattern is defined on the optical device. In this embodiment, the area outside the circular pattern is stripped so that the circular full-color filter (RGB filter) as shown in FIG. 3C is obtained. In addition, it should be understood to one of ordinary skill in the art that other kinds of optical devices, such as dichroic mirrors, might also be manufactured according to the above mentioned manufacturing processes.

In summary, the method of the invention is performed to cut the thermal tape 22 into a plurality of tape areas according to the desired pattern, so that the tape areas of the color films to be coated (e.g. the first color film 23, the second color film 24 and the third color film 25) can be defined. Therefore, use of a mask in the photolithography process is unnecessary, and the cost of the mask and exposure machine is eliminated. In addition, the same pin may be used to coat each film in the method of the invention. The desired patterns are easily modified, without changing the pin, so as to manufacture optical devices of any shape.

While the invention has been described by way of an example and in terms of a preferred embodiment, it is to be understood that the invention is not limited to the disclosed embodiment. To the contrary, it is intended to cover various modifications. Therefore, the scope of the appended claims should be accorded the broadest interpretation so as to encompass all such modifications.

What is claimed is:

1. A method for manufacturing an optical device, comprising:

forming a thermal tape on a glass substrate;

cutting the thermal tape into a plurality of tape areas to define a pattern for the optical device;

removing at least one of the tape areas of the thermal tape; and coating a first color film on the tape area without the thermal tape.

2. The method according to claim 1, further comprising:

cleaning the glass substrate before forming the thermal tape.

3. The method according to claim 1, further comprising:

coating a first over coat film on the first color film;

removing at least another one of the tape areas of the thermal tape; and coating a second color film on the tape area without the thermal tape.

4. The method according to claim 3, further comprising:

stripping the first over coat film.

5. The method according to claim 3, wherein the first over coat film is a photo-resist layer.

6. The method according to claim 5, further comprising:

soft-baking the optical device to solidify the photo-resist layer after coating the photo-resist layer; and exposing the optical device to develop the photo-resist layer.

7. The method according to claim 1, further comprising:

stripping the glass substrate outside a range defined by the pattern of the optical device.

8. The method according to claim 1, wherein the optical device is an RGB filter.

9. The method according to claim 1, wherein the optical device is a dichroic mirror.

* * * * *